United States Patent
Toyooka et al.

(10) Patent No.: US 7,114,591 B2
(45) Date of Patent: Oct. 3, 2006

(54) STEERING SYSTEM FOR WORKING TRUCK

(75) Inventors: Tsukasa Toyooka, Ibaraki-ken (JP); Makoto Sugaya, Narita (JP); Makoto Matsushita, Ushiku (JP); Kensuke Satou, Ibaraki-ken (JP); Yuuji Nagashima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/500,656

(22) PCT Filed: Feb. 26, 2003

(86) PCT No.: PCT/JP03/02128

§ 371 (c)(1),
(2), (4) Date: Jul. 2, 2004

(87) PCT Pub. No.: WO03/072419

PCT Pub. Date: Sep. 4, 2003

(65) Prior Publication Data

US 2005/0067212 A1  Mar. 31, 2005

(30) Foreign Application Priority Data

Feb. 27, 2002 (JP) .............................. 2002-051675

(51) Int. Cl.
B62D 5/06 (2006.01)

(52) U.S. Cl. ....................... 180/410; 180/417; 180/428; 180/441

(58) Field of Classification Search ................. 180/410
See application file for complete search history.

(56) References Cited

U.S. PATENT DOCUMENTS 3,596,730 A * 8/1971 Cecce .................. 180/236

(Continued)

FOREIGN PATENT DOCUMENTS

EP  300 774  1/1989

(Continued)

*Primary Examiner*—Lesley D. Morris
*Assistant Examiner*—Marlon Arce-Diaz
(74) *Attorney, Agent, or Firm*—Mattingly, Stanger, Malur & Brundidge, P.C.

(57) ABSTRACT

One of the mode lamps 38a, 38b and 38c of the mode indicator 38 corresponding to the current steering mode is turned on yellow and the other mode lamps are turned on green or turned off, thereby indicating whether front wheels 1, 1 and rear wheels 2, 2 are at neutral. A controller 39 does not operate a mode changing valve 24 even with an instruction outputted from a mode change switch 35 when the front and rear wheels are not at neutral, and operates, in response to an instruction outputted from the mode change switch 35, the mode changing valve 24 to establish a steering mode corresponding to the instruction when the front and rear wheels are at neutral. Also, the mode indicator 38 is controlled to always indicate, as the current steering mode, one corresponding to the steering mode actually established by the mode changing valve 24. With those features, in a working vehicle in which the mode of steering front and rear wheels can be changed over between two-wheel steering and four-wheel steering, a steering system having superior operability and high reliability can be provided.

6 Claims, 4 Drawing Sheets

U.S. PATENT DOCUMENTS

| | | | | |
|---|---|---|---|---|
| 3,856,102 A | * | 12/1974 | Queen | 180/414 |
| 3,903,983 A | * | 9/1975 | Yeske | 180/414 |
| 4,621,702 A | * | 11/1986 | Kanazawa et al. | 180/414 |
| 4,715,466 A | * | 12/1987 | Ishii et al. | 180/233 |
| 4,798,393 A | * | 1/1989 | Miura et al. | 180/409 |
| 5,020,627 A | * | 6/1991 | Wittke | 180/234 |
| 5,515,026 A | * | 5/1996 | Ewert | 340/436 |
| 6,481,524 B1 | * | 11/2002 | Ishida et al. | 180/252 |

FOREIGN PATENT DOCUMENTS

| | | | |
|---|---|---|---|
| EP | 0439370 | * | 1/1991 |
| EP | 439 370 | | 7/1991 |
| JP | 3-61477 | | 6/1991 |
| JP | 4-19267 | | 1/1992 |
| JP | 4-230474 | | 8/1992 |
| JP | 7-23686 | | 5/1995 |

* cited by examiner

STEERING SYSTEM FOR WORKING TRUCK

TECHNICAL FIELD

The present invention relates to a steering system for a working vehicle having front and rear wheels. More particularly, the present invention relates to a steering system for a working vehicle, which can change over a mode of steering front and rear wheels between two-wheel steering and four-wheel steering.

BACKGROUND ART

A steering system for a working vehicle, which is already equipped in an actual machine, comprises front and rear wheels, a steering apparatus for steering the front and rear wheels, mode changing means for changing over a mode of steering the front and rear wheels among two-wheel steering (2WS), opposite-phase four-wheel steering (4WS) and in-phase four-wheel steering (Crab), and mode instructing means for instructing change of the mode of steering the front and rear wheels.

The mode instructing means is constituted as a dial-type mode change switch having three shift positions "4WS", "2WS" and "Crab". These three shift positions are visually labeled as "4WS", "2WS" and "Crab". Also, as soon as the mode change switch is shifted, a mode changing valve serving as the mode changing means is also shifted to make the selected mode effective. A neutral lamp is provided which is turned on when the front and rear wheels are at neutral. When changing the steering mode, an operator shifts the mode change switch after confirming that the neutral lamp is turned on.

EP0300774A2 and EP0439370A1 propose a system in which, even when the mode change switch is shifted, the mode changing valve is kept from shifting until the front wheels come into neutral, and the mode changing valve is shifted and the selected mode is made effective only after the front wheels have come into neutral.

DISCLOSURE OF THE INVENTION

However, the above-described related art has problems given below.

In the steering system for the working vehicle which is equipped in an actual machine, even when the operator shifts the mode change switch unintentionally in the state of the front and rear wheels being not at neutral, the mode change valve is shifted to the instructed mode position at once. Therefore, the front and rear wheels often cannot have proper postures corresponding to the instructed steering mode. In the case of changing the steering mode from 4WS to 2WS, for example, when the mode change switch is shifted before the front and rear wheels return to neutral, the 2WS steering is made effective while the rear wheels remain fixed at non-neutral (i.e., remain in postures not orientated in the straightforward direction). Conversely, in the case of changing the steering mode from 2WS to 4WS, when the mode change switch is shifted before the rear wheels return to neutral, the 4WS steering is made effective while angles of the front and rear wheels remain not in match with each other. If the operator turns a steering wheel in such a condition, a vehicle body cannot travel in the direction intended by the operator. Accordingly, the operator is always required to shift the mode selection switch while carefully checking the neutral lamp and confirming whether the front and rear wheels have come into neutral. That requirement has resulted in poor operability.

The steering system for the working vehicle, disclosed in EP0300774A2 and EP0439370A1, is able to overcome the problems mentioned above. With this related art, however, when the operator shifts the mode change switch unintentionally in the state of the front and rear wheels being not at neutral, another problem occurs as follows. In spite of the mode change switch being shifted, the steering mode (i.e., the shift position of the mode changing valve) is kept in the same state as that taken so far until the front and rear wheels come into neutral. This results in a condition that the shift position of the mode change switch does not match with the actual steering mode. In such a condition, the operator may mistake the shift position of the mode change switch for the actual steering mode, and may perform steering in wrong way.

An object of the present invention is to provide a steering system for a working vehicle in which a mode of steering front and rear wheels can be changed over between two-wheel steering and four-wheel steering, the steering system having superior operability and high reliability.

(1) To achieve the above object, the present invention provides a steering system for a working vehicle comprising front wheels, rear wheels, and a steering apparatus for steering the front wheels and the rear wheels, the steering system comprising mode changing means provided in the steering apparatus for changing over a mode of steering the front wheels and the rear wheels between two-wheel steering and four-wheel steering; mode change instructing means for instructing change of the mode of steering the front wheels and the rear wheels; first indicating means for indicating a current steering mode of the front wheels and the rear wheels; second indicating means for indicating whether the front wheels and the rear wheels are at neutral; and control means for not operating the mode changing means even with an instruction outputted from the mode change instructing means when the second indicating means indicates that the front wheels and the rear wheels are not at neutral, for operating the mode changing means, in response to an instruction outputted from the mode change instructing means, to establish a steering mode corresponding to the instruction when the second indicating means indicates that the front wheels and the rear wheels are at neutral, and for controlling the first indicating means to always indicate, as the current steering mode, a steering mode corresponding to an operated state of the mode changing means regardless of the instruction outputted from the mode change instructing means.

Thus, the second indicating means and the control means are provided in addition to the first indicating means. When the second indicating means indicates that the front wheels and the rear wheels are not at neutral, the mode changing means is not operated even with an instruction outputted from the mode change instructing means. When the second indicating means indicates that the front wheels and the rear wheels are at neutral, the mode changing means is operated, in response to an instruction outputted from the mode change instructing means, to establish a steering mode corresponding to the instruction. Accordingly, even if an operator manipulates the mode change instructing means unintentionally when the front wheels and the rear wheels are not at neutral, the steering mode is not changed and the front wheels and the rear wheels can be always held in proper postures corresponding to the current steering mode. Superior operability can be hence obtained.

Further, regardless of the instruction outputted from the mode change instructing means, the first indicating means is controlled to always indicate, as the current steering mode, a steering mode corresponding to an operated state of the mode changing means. Accordingly, even if the operator manipulates the mode change instructing means unintentionally when the front wheels and the rear wheels are not at neutral, the mode changing means is not shifted as mentioned above and therefore the indication of the first indicating means is also not changed. As a result, the operator can always change the steering mode while recognizing the proper steering mode, thus resulting in high reliability.

(2) In the above (1), preferably, the first indicating means has a plurality of mode lamps provided corresponding to kinds of steering modes, one of the mode lamps corresponding to the current steering mode being turned on in a predetermined color, and one or more of the plurality of mode lamps other than the mode lamp corresponding to the current steering mode function as the second indicating means.

With those features, since the mode lamps of the first indicating means serve also to provide the neutral indicating function of said second indicting means, the construction is simplified. Also, since the operator is able to simultaneously know both the current steering mode and whether the front wheels and the rear wheels are at neutral, by looking at the mode lamps of the first indicating means, very high convenience is realized in use.

(3) In the above (2), preferably, the mode lamps functioning as the second indicating means are turned on in a color different from that of the mode lamp corresponding to the current steering mode when the front wheels and the rear wheels are in neutral positions.

With that feature, it is possible to indicate both the current steering mode and whether the front wheels and the rear wheels are at neutral, based on a difference in colors of the turned-on mode lamps while employing the same mode lamps.

(4) In the above (2) or (3), preferably, the mode change instructing means has a plurality of switches disposed in positions corresponding to the plurality of mode lamps, respectively.

With that feature, the operator is able to instruct change of the steering mode while looking at the plurality of mode lamps (first and second indicating means), and therefore very high convenience is realized in use.

(5) In the above (4), preferably, the plurality of switches are momentarily operated switches outputting signals only when operated.

With that feature, even if the operator manipulates any switch of the mode change instructing means unintentionally when the front wheels and the rear wheels are not at neutral, the outputted signal disappears when the operator releases the hand from the switch. Accordingly, unless the switch is manipulated again when the front wheels and the rear wheels are at neutral, the steering mode is not changed. As a result, the steering mode can be reliably changed in accordance with the intention of the operator, whereby operability and reliability can be further improved.

(6) In the above (1) to (5), preferably, the mode changing means is able to change over the mode of steering the front wheels and the rear wheels among two-wheel steering, opposite-phase four-wheel steering, and in-phase four-wheel steering.

With that feature, a steering system having superior operability and high reliability can be provided while constructing the system to be able to change over the steering mode among three modes, i.e., two-wheel steering, opposite-phase four-wheel steering, and in-phase four-wheel steering.

BEST MODE FOR CARRYING OUT THE INVENTION

An embodiment of the present invention will be described below with reference to the drawings.

Figure 1:
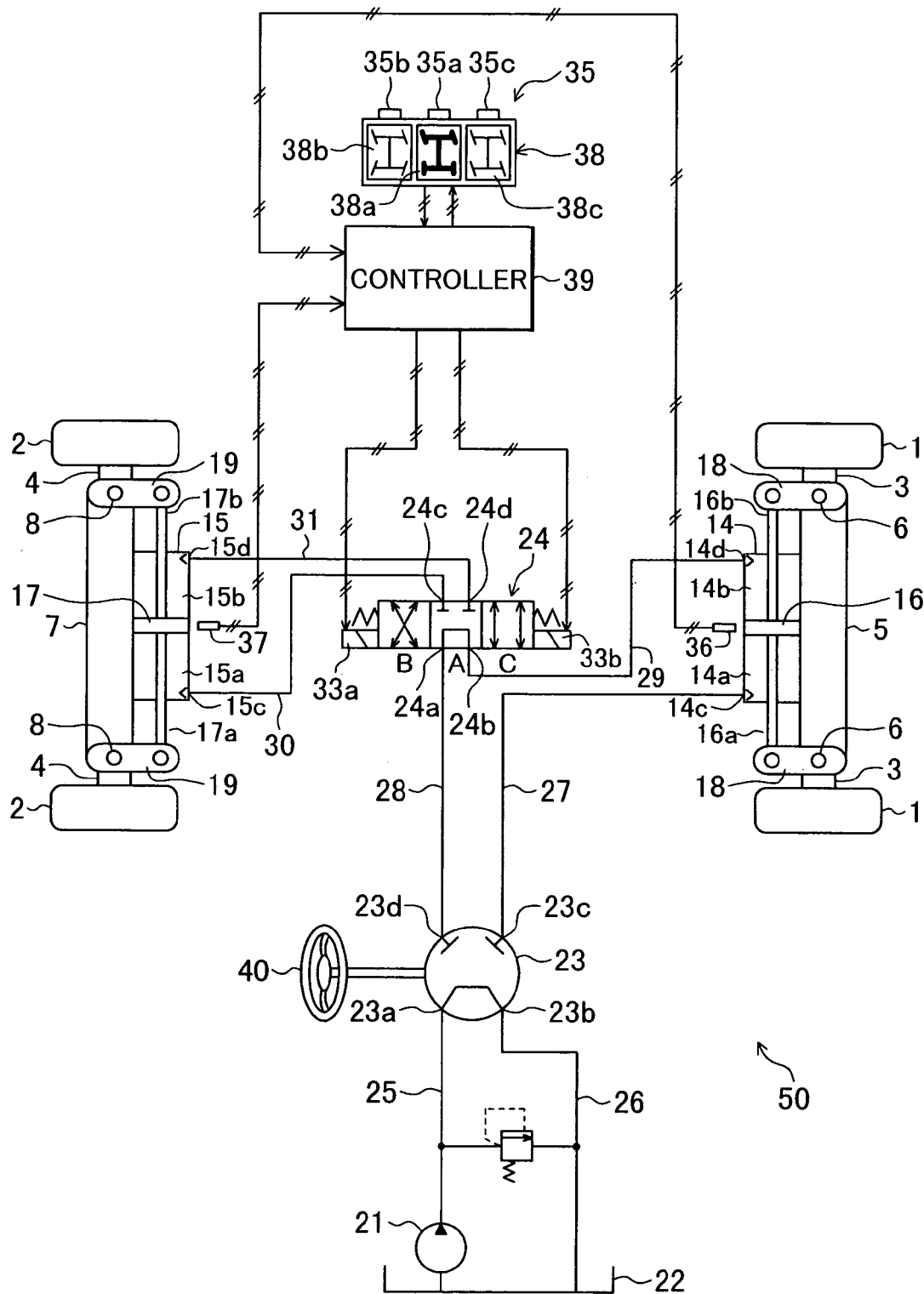
FIG. 1 shows a steering system for a working vehicle according to one embodiment of the present invention.

FIG. 1 shows a steering system for a working vehicle according to one embodiment of the present invention.

Referring to FIG. 1, the working vehicle has front wheels 1, 1 and rear wheels 2, 2 on the left and right sides. The front wheels 1, 1 and the rear wheels 2, 2 are rotatably supported respectively by front axles 3, 3 and rear axles 4, 4. The front axles 3, 3 are rotatably (steerably) mounted to opposite ends of a front axle system by steering pins 6, 6, respectively. The rear axles 4, 4 are rotatably (steerably) mounted to opposite ends of a rear axle system 7 by steering pins 8, 8, respectively.

Also, a steering apparatus 50 for steering the front wheels 1, 1 and the rear wheels 2, 2 is provided. The steering apparatus 50 primarily comprises steering cylinders 14, 15 and a steering valve 23. The steering apparatus 50 further comprises a mode changing valve 24 serving as mode changing means for changing over a mode of steering the front wheels 1, 1 and the rear wheels 2, 2 among "2WS" (front two-wheel steering), "4WS" (opposite-phase four-wheel steering), and "Crab" (in-phase four-wheel steering).

The steering cylinders 14, 15 are mounted to the front axle system 5 and the rear axle system 7, respectively, as shown. Inner spaces of the steering cylinders 14, 15 are each divided into two cylinder chambers 14a, 14b; 15a, 15b by pistons 16, 17, respectively. Right and left piston rods (operating rods) 16a, 16b; 17a, 17b are extended from the pistons 16, 17 so as to project out of the corresponding cylinders. Fore ends of the piston rods 16a, 16b ate linked to the steering pins 6, 6 through link members 18, 18 and fore ends of the piston rods 17a, 17b are linked to the steering pins 8, 8 through link members 19, 19, respectively.

When a hydraulic fluid flows into the cylinder chamber 14a of the steering cylinder 14, the piston 16 and the piston rods 16a, 16b are moved upward, as viewed in the drawing, to rotate the steering pins 6, 6 clockwise so that directions of the front wheels 1, 1 are changed to the right with respect to the vehicle running direction. When a hydraulic fluid flows into the cylinder chamber 14b of the steering cylinder 14, the piston 16 and the piston rods 16a, 16b are moved downward, as viewed in the drawing, to rotate the steering pins 6, 6 counterclockwise so that directions of the front wheels 1, 1 are changed to the left with respect to the vehicle running direction. Steering operations are also performed on the side of the steering cylinder 15 in a similar manner.

The steering valve 23 has a pump port 23a, a reservoir port 23b, and two actuator ports 23c, 23d. The pump port 23a is connected to a hydraulic pump 21 through a pump line 25, and the reservoir port 23b is connected to a reservoir 22 through a reservoir line 26. The actuator port 23c is connected to a port 14c on the side of the cylinder chamber 14a of the front wheel steering cylinder 14 through an actuator line 27, and the actuator port 23d is connected to one port 24a of the mode changing valve 24.

The steering valve 23 is one kind of servo switching valve operated by a steering wheel 40. When the steering wheel 40 is turned to the right, the pump port 23a is connected to the actuator port 23c and the actuator port 23d is connected to the reservoir port 23b. Then, when the hydraulic fluid is supplied from the pump port 23a to the actuator port 23c at a flow rate corresponding to the angle by which the steering wheel 40 has been turned, the above port connections are cut off and the steering valve 23 is returned to the shown state in which the pump port 23a is connected to the reservoir port 23b. Likewise, when the steering wheel 40 is turned to the left, the pump port 23a is connected to the actuator port 23d and the actuator port 23c is connected to the reservoir port 23b. Then, when the hydraulic fluid is supplied from the pump port 23a to the actuator port 23d at a flow rate corresponding to the angle by which the steering wheel 40 has been turned, the above port connections are cut off and the steering valve 23 is returned to the shown state in which the pump port 23a is connected to the reservoir port 23b.

The mode changing valve 24 is disposed between the steering valve 23 and the front and rear steering cylinders 14, 15, and changes the destination to which the hydraulic fluid is supplied from the steering valve 23. The mode of steering the front wheels 1, 1 and the rear wheels 2, 2 is thereby changed over among the 2WS (front two-wheel steering) mode, the 4WS (opposite-phase four-wheel steering) mode, and the "Crab" (in-phase four-wheel steering) mode.

More specifically, the mode changing valve 24 has four ports 24a, 24b, 24c and 24d. The port 24a is connected, as mentioned above, to the actuator ports 23d of the steering valve 23 through an actuator line 28, and the port 24b is connected to the port 14d of the front wheel steering cylinder 14 on the side of the cylinder chamber 14b through an actuator line 29. The ports 24c, 24d are connected to the ports 15c, 15d of the steering cylinder 15 on the side of the cylinder chambers 15a, 15b through actuator lines 30, 31, respectively. The mode changing valve 24 is shifted to any one of a first position A, a second position B, and a third position C by left and right solenoids 33a, 33b. When the mode changing valve 24 is in the first position A, the port 24a is connected to the port 24b and the ports 24c, 24d are both cut off. When it is shifted to the second position B, the port 24a is connected to the port 24d and the port 24c is connected to the port 24b. When it is shifted to the third position C, the port 24a is connected to the port 24c and the port 24d is connected to the port 24b.

The first position A of the mode changing valve 24 represents a position for making the 2WS mode effective, the second position B represents a position for making the 4WS mode effective, and the third position C represents a position for making the "Crab" mode effective.

When the steering wheel 40 is turned to the right, for example, in the state of the mode changing valve 24 being in the first position A, the hydraulic fluid supplied to the actuator port 23c of the steering valve 23 at a flow rate corresponding to the turn angle of the steering wheel 40 is, as described above, introduced to the cylinder chamber 14a of the steering cylinder 14 through the actuator line 27 and the port 14c, whereby the directions of the front wheels 1, 1 are changed to the right with respect to the vehicle running direction. At this time, the hydraulic fluid drained from the cylinder chamber 14b is returned to the reservoir 22 through the port 14d, the actuator line 29, the ports 24b, 24a of the mode changing valve 24, the actuator line 28, the actuator port 23d and the reservoir port 23b of the steering valve 23, and the reservoir line 26. Further, the angle (steering angle) by which the directions of the front wheels 1, 1 are changed is given as an angle corresponding to the flow rate of the hydraulic fluid supplied from the steering valve 23 (i.e., the turn angle of the steering wheel 40).

When the steering wheel 40 is turned to the left in the state of the mode changing valve 24 being in the first position A, the hydraulic fluid supplied to the actuator port 23d of the steering valve 23 at a flow rate corresponding to the turn angle of the steering wheel 40 is, as described above, introduced to the cylinder chamber 14b of the steering cylinder 14 through the actuator line 28, the ports 24a, 24b of the mode changing valve 24, the actuator line 29, and the port 14d, whereby the directions of the front wheels 1, 1 are changed to the left with respect to the vehicle running direction. At this time, the hydraulic fluid drained from the cylinder chamber 14a is returned to the reservoir 22 through the port 14c, the actuator line 27, the actuator port 23c and the reservoir port 23b of the steering valve 23, and the reservoir line 26. Further, the angle (steering angle) by which the directions of the front wheels 1, 1 are changed is given as an angle corresponding to the flow rate of the hydraulic fluid supplied from the steering valve 23 (i.e., the turn angle of the steering wheel 40).

When the steering wheel 40 is turned to the right in the state of the mode changing valve 24 being in the second position B, the hydraulic fluid supplied to the actuator port 23c of the steering valve 23 at a flow rate corresponding to the turn angle of the steering wheel 40 is, as described above, introduced to the cylinder chamber 14a of the steering cylinder 14 through the actuator line 27 and the port 14c, whereby the directions of the front wheels 1, 1 are changed to the right with respect to the vehicle running direction. Also, the hydraulic fluid drained from the cylinder chamber 14b of the steering cylinder 14 is supplied to the cylinder chamber 15a of the steering cylinder 15 through the actuator line 29, the ports 24b, 24c of the mode changing valve 24, the actuator line 30, and the port 15c, whereby the directions of the rear wheels 2, 2 are changed to the left with respect to the vehicle running direction opposite to the steering direction of the front wheels 1, 1. At this time, the hydraulic fluid drained from the cylinder chamber 15b is returned to the reservoir 22 through the port 15d, the actuator line 31, the ports 24d, 24a of the mode changing valve 24, the actuator line 28, the actuator port 23d and the reservoir port 23b of the steering valve 23, and the reservoir line 26. Further, the flow rate of the hydraulic fluid supplied to the cylinder chamber 14a of the steering cylinder 14 is equal to the flow rate of the hydraulic fluid drained from the cylinder chamber 14b so that the angles (steering angles) by which the directions of the front wheels 1, 1 and the rear wheels 2, 2 are changed are each given as an angle corresponding to the flow rate of the hydraulic fluid supplied from the steering valve 23 (i.e., the turn angle of the steering wheel 40).

When the steering wheel 40 is turned to the left in the state of the mode changing valve 24 being in the second position B, the hydraulic fluid supplied to the actuator port 23d at a flow rate corresponding to the turn angle of the steering wheel 40 is, as described above, introduced to the cylinder chamber 15b of the steering cylinder 15 through the actuator line 28, the ports 24a, 24d of the mode changing valve 24, the actuator line 31, and the port 15d, whereby the directions of the rear wheels 2, 2 are changed to the right with respect to the vehicle running direction. Also, the hydraulic fluid drained from the cylinder chamber 15a of the steering cylinder 15 is supplied to the cylinder chamber 14b of the steering cylinder 14 through the actuator line 30, the ports 24c, 24b of the mode changing valve 24, the actuator line 29, and the port 14d, whereby the directions of the front wheels 1, 1 are changed to the left with respect to the vehicle running direction opposite to the steering direction of the rear wheels 2, 2. At this time, the hydraulic fluid drained from the cylinder chamber 14a is returned to the reservoir 22 through the port 14c, the actuator line 27, the actuator port 23c and the reservoir port 23b of the steering valve 23, and the reservoir line 26. Further, the flow rate of the hydraulic fluid supplied to the cylinder chamber 15b of the steering cylinder 15 is equal to the flow rate of the hydraulic fluid drained from the cylinder chamber 15a so that the angles (steering angles) by which the directions of the front wheels 1, 1 and the rear wheels 2, 2 are changed are each given as an angle corresponding to the flow rate of the hydraulic fluid supplied from the steering valve 23 (i.e., the turn angle of the steering wheel 40).

When the steering wheel 40 is turned to the right in the state of the mode changing valve 24 being in the third position C, the hydraulic fluid supplied to the actuator port 23c of the steering valve 23 at a flow rate corresponding to the turn angle of the steering wheel 40 is, as described above, introduced to the cylinder chamber 14a of the steering cylinder 14 through the actuator line 27 and the port 14c, whereby the directions of the front wheels 1, 1 are changed to the right with respect to the vehicle running direction. Also, the hydraulic fluid drained from the cylinder chamber 14b of the steering cylinder 14 is supplied to the cylinder chamber 15b of the steering cylinder 15 through the actuator line 29, the ports 24b, 24d of the mode changing valve 24, the actuator line 31, and the port 15d, whereby the directions of the rear wheels 2, 2 are changed to the right with respect to the vehicle running direction in match with the steering direction of the front wheels 1, 1. At this time, the hydraulic fluid drained from the cylinder chamber 15a is returned to the reservoir 22 through the port 15c, the actuator line 30, the ports 24c, 24a of the mode changing valve 24, the actuator line 28, the actuator port 23d and the reservoir port 23b of the steering valve 23, and the reservoir line 26. Further, the flow rate of the hydraulic fluid supplied to the cylinder chamber 14a of the steering cylinder 14 is equal to the flow rate of the hydraulic fluid drained from the cylinder chamber 14b so that the angles (steering angles) by which the directions of the front wheels 1, 1 and the rear wheels 2, 2 are changed are each given as an angle corresponding to the flow rate of the hydraulic fluid supplied from the steering valve 23 (i.e., the turn angle of the steering wheel 40).

When the steering wheel 40 is turned to the left in the state of the mode changing valve 24 being in the third position C, the hydraulic fluid supplied to the actuator port 23d at a flow rate corresponding to the turn angle of the steering wheel 40 is, as described above, introduced to the cylinder chamber 15a of the steering cylinder 15 through the actuator line 28, the ports 24a, 24c of the mode changing valve 24, the actuator line 30, and the port 15c, whereby the directions of the rear wheels 2, 2 are changed to the left with respect to the vehicle running direction. Also, the hydraulic fluid drained from the cylinder chamber 15b of the steering cylinder 15 is supplied to the cylinder chamber 14b of the steering cylinder 14 through the actuator line 31, the ports 24d, 24b of the mode changing valve 24, the actuator line 29, and the port 14d, whereby the directions of the front wheels 1, 1 are changed to the left with respect to the vehicle running direction in match with the steering direction of the rear wheels 2, 2. At this time, the hydraulic fluid drained from the cylinder chamber 14a is returned to the reservoir 22 through the port 14c, the actuator line 27, the actuator port 23c and the reservoir port 23b of the steering valve 23, and the reservoir line 26. Further, the flow rate of the hydraulic fluid supplied to the cylinder chamber 15a of the steering cylinder 15 is equal to the flow rate of the hydraulic fluid drained from the cylinder chamber 15b so that the angles (steering angles) by which the directions of the front wheels 1, 1 and the rear wheels 2, 2 are changed are each given as an angle corresponding to the flow rate of the hydraulic fluid supplied from the steering valve 23 (i.e., the turn angle of the steering wheel 40).

As means for shifting and controlling the mode changing valve 24, there are provided a 3-button-type mode change switch 35 for instructing change of the mode of steering the front wheels 1, 1 and the rear wheels 2, 2, a front wheel neutral sensor 36 for detecting that the front wheels 1, 1 are at neutral, a rear wheel neutral sensor 37 for detecting that the rear wheels 2, 2 are at neutral, a mode indicator 38 being integral with the mode change switch 35, the mode indicator 38 indicating the current steering mode of the front wheels 1, 1 and the rear wheels 2, 2 and whether the front wheels 1, 1 and the rear wheels 2, 2 are at neutral (i.e., whether they are in a state enable to instruct change of the steering mode), and a controller 39.

The mode change switch 35 has three push buttons 35a, 35b and 35c corresponding to 2WS (front two-wheel steering), 4WS (opposite-phase four-wheel steering), and "Crab" (in-phase four-wheel steering), respectively. Those push buttons 35a, 35b and 35c are constituted as momentarily operated switches which output signals only when depressed by the operator, and which stop outputting of the signals when the operator releases the hand from the push buttons.

The front and rear wheel neutral sensors 36, 37 are constituted by position sensors mounted to respective outer surfaces of the steering cylinders 14, 15, and detect that the front wheels 1, 1 and the rear wheels 2, 2 are at neutral, by detecting whether the pistons 16, 17 are in neutral positions of the steering cylinders 14, 15.

The mode indicator 38 has three mode lamps 38a, 38b and 38c corresponding to 2WS (front two-wheel steering), 4WS (opposite-phase four-wheel steering), and "Crab" (in-phase four-wheel steering), respectively. The three push buttons 35a, 35b and 35c of the mode change switch 35 are disposed close to the mode lamps 38a, 38b and 38c in one-to-one corresponding relation, respectively.

The controller 39 receives instruction signals from the three push buttons 35a, 35b and 35c of the mode change switch 35 and detected signals from the neutral sensors 36, 37. After executing predetermined processing, the controller 39 outputs control signals to the three mode lamps 38a, 38b and 38c of the mode indicator 38 and the solenoids 33a, 33b of the mode changing valve 24. In this connection, the mode lamp corresponding to the current steering mode (i.e., the current shift position of the mode changing valve 24) is turned on yellow. Then, the mode lamps other than one corresponding to the current steering mode are turned off when the front wheels 1, 1 and the rear wheels 2, 2 are not in the neutral positions, and those other mode lamps are turned on green when the front wheels 1, 1 and the rear wheels 2, 2 are in the neutral positions. Further, when the front wheels 1, 1 and the rear wheels 2, 2 are not in the neutral positions, the instruction signals from the push buttons 35*a*, 35*b* and 35*c* are made ineffective. When the front wheels 1, 1 and the rear wheels 2, 2 come into the neutral positions, the instruction signals from the push buttons 35*a*, 35*b* and 35*c* are made effective and the mode changing valve 24 is shifted so as to establish the steering mode corresponding to the instruction signal.

Figure 2:
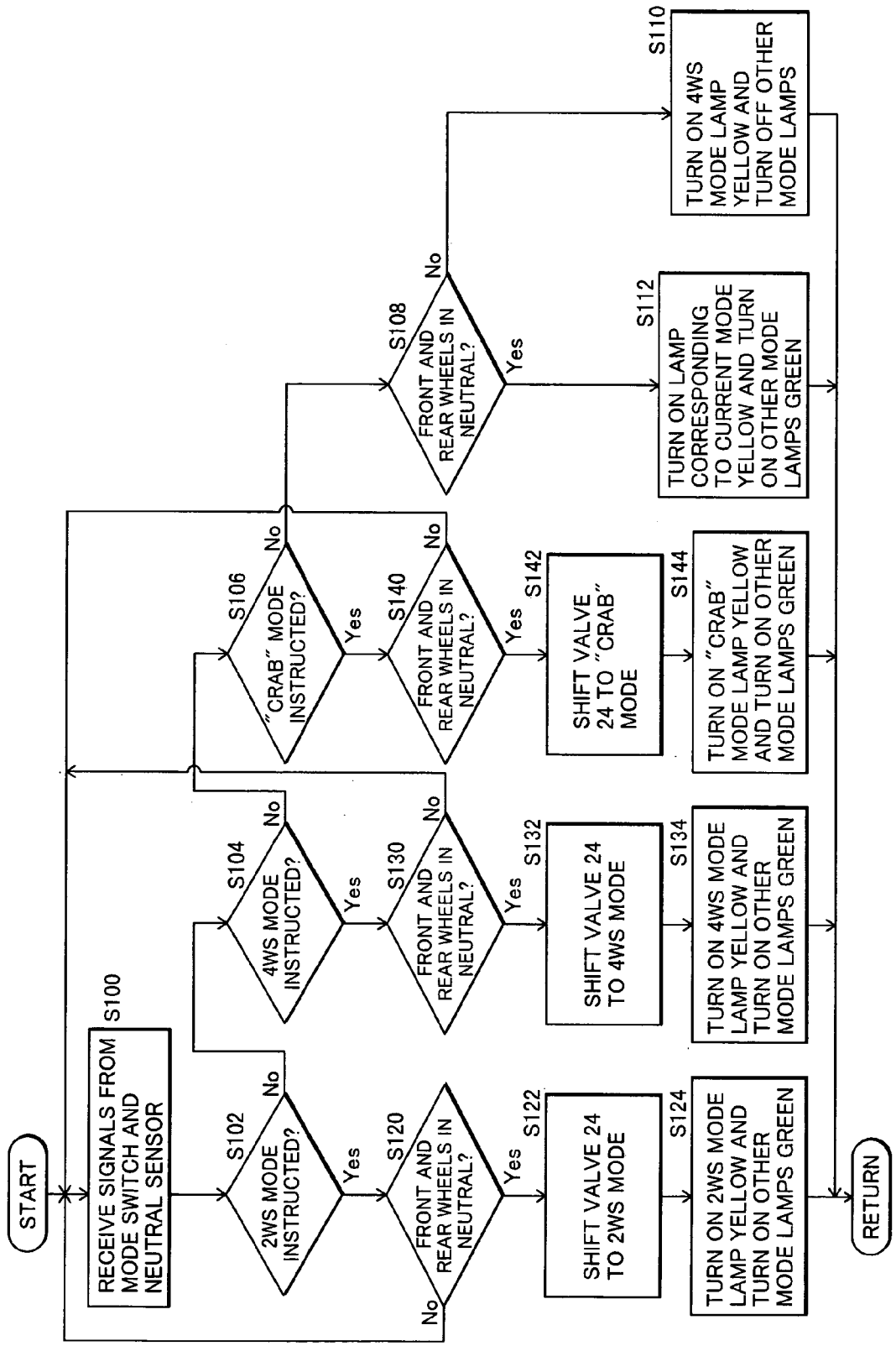
FIG. 2 is a flowchart showing processing functions of a controller shown in FIG. 1.

FIG. 2 is a flowchart showing the processing functions of the controller 39.

Referring to FIG. 2, the controller 39 first receives the instruction signal from the mode change switch 35 and detected signals from the neutral sensors 36, 37 (step S100). Then, it determines successively whether the 2WS mode instruction signal is outputted from the push button 35*a* of the mode change switch 35 (step S102), whether the 4WS mode instruction signal is outputted from the push button 35*b* (step S104), and whether the "Crab" mode instruction signal is outputted from the push button 35*c* (step S106). If all of those determinations are negated, i.e., if no instruction signals are outputted, the controller determines based on the detected signals from the neutral sensors 36, 37 whether the front wheels 1, 1 and the rear wheels 2, 2 are both at neutral (step S108). If the determination in step S108 is "No", i.e., if the front wheels 1, 1 and the rear wheels 2, 2 are both not at neutral, the mode lamp of the mode indicator 38 corresponding to the current steering mode (i.e., the current shift position of the mode changing valve 24) is turned on yellow and the other mode lamps are turned off (step S110). If the determination in step S108 is "Yes", i.e., if the front wheels 1, 1 and the rear wheels 2, 2 are both at neutral, the mode lamp of the mode indicator 38 corresponding to the current steering mode (i.e., the current shift position of the mode changing valve 24) is turned on yellow and the other mode lamps are turned on green (step S112).

On the other hand, if the determination in step S102 is affirmed and the 2WS mode instruction signal is outputted from the push button 35*a* of the mode change switch 35, the controller determines based on the detected signals from the neutral sensors 36, 37 whether the front wheels 1, 1 and the rear wheels 2, 2 are both at neutral (step S120). If the determination in step S120 is negated, the controller returns to step S100 and repeats a sequence of the steps described above. If the determination in step S120 is affirmed, i.e., if the front wheels 1, 1 and the rear wheels 2, 2 are both at neutral, the mode changing valve 24 is shifted to the first shift position A corresponding to the 2WS mode (step S122). In practical control, the control signals outputted to the solenoids 33*a*, 33*b* are set to 0. At the same time, the 2WS mode lamp 38*a* of the mode indicator 38 is turned on yellow and the other mode lamps 38*b*, 38*c* are turned on green (step S124).

Also, if the determination in step S104 is affirmed and the 4WS mode instruction signal is outputted from the push button 35*b* of the mode change switch 35, the controller determines based on the detected signals from the neutral sensors 36, 37 whether the front wheels 1, 1 and the rear wheels 2, 2 are both at neutral (step S130). If the determination in step S130 is negated, the controller returns to step S100 and repeats a sequence of the steps described above. If the determination in step S130 is affirmed, i.e., if the front wheels 1, 1 and the rear wheels 2, 2 are both at neutral, the mode changing valve 24 is shifted to the second shift position B corresponding to the 4WS mode (step S132). In practical control, the control signal at a predetermined level is outputted to the solenoid 33*a*. At the same time, the 4WS mode lamp 38*b* of the mode indicator 38 is turned on yellow and the other mode lamps 38*a*, 38*c* are turned on green (step S134).

Likewise, if the determination in step S106 is affirmed and the "Crab" mode instruction signal is outputted from the push button 35*c* of the mode change switch 35, the controller determines based on the detected signals from the neutral sensors 36, 37 whether the front wheels 1, 1 and the rear wheels 2, 2 are both at neutral (step S140). If the determination in step S140 is negated, the controller returns to step S100 and repeats a sequence of the steps described above. If the determination in step S140 is affirmed, i.e., if the front wheels 1, 1 and the rear wheels 2, 2 are both at neutral, the mode changing valve 24 is shifted to the third shift position C corresponding to the "Crab" mode (step S142). In practical control, the control signal at a predetermined level is outputted to the solenoid 33*b*. At the same time, the "Crab" mode lamp 38*c* of the mode indicator 38 is turned on yellow and the other mode lamps 38*a*, 38*b* are turned on green (step S144).

In the arrangement thus constructed, the mode changing valve 24 constitutes mode changing means for changing over the mode of steering the front wheels 1, 1 and the rear wheels 2, 2 among the two-wheel steering (2WS), the opposite-phase four-wheel steering (4WS) and the in-phase four-wheel steering (Crab), as mentioned above. Also, the mode change switch 35 constitutes mode change instructing means for instructing change of the mode of steering the front wheels 1, 1 and the rear wheels 2, 2. The mode indicator 38 constitutes first indicating means for indicating the current steering mode of the front wheels 1, 1 and the rear wheels 2, 2. Of the mode lamps 38*a*, 38*b* and 38*c* of the mode indicator 38, the mode lamps other than one corresponding to the current steering mode and turned on yellow constitute second indicating means for indicating whether the front wheels 1, 1 and the rear wheels 2, 2 are at neutral. The front wheel neutral sensor 36, the rear wheel neutral sensor 37, and the processing functions of the controller 39 shown in the flowchart of FIG. 2 constitute control means for not operating the mode changing means 24 even with an instruction outputted from the mode change instructing means 35 when the second indicating means indicates that the front wheels 1, 1 and the rear wheels 2, 2 are not at neutral (S110→S100→S102, S130, S140→S100 in FIG. 2), for operating the mode changing means 24, in response to an instruction outputted from the mode change instructing means 35, to establish a steering mode corresponding to the instruction when the second indicating means indicates that the front wheels 1, 1 and the rear wheels 2, 2 are at neutral (S112→S100→S102→S122; S130→132; S140→142 in FIG. 2), and for controlling the first indicating means 38 to always indicate, as the current steering mode, a steering mode corresponding to the steering mode effectuated by the mode changing means 24 regardless of the instruction outputted from the mode change instructing means 35 (S124, S134, S144 in FIG. 2).

Figure 3:
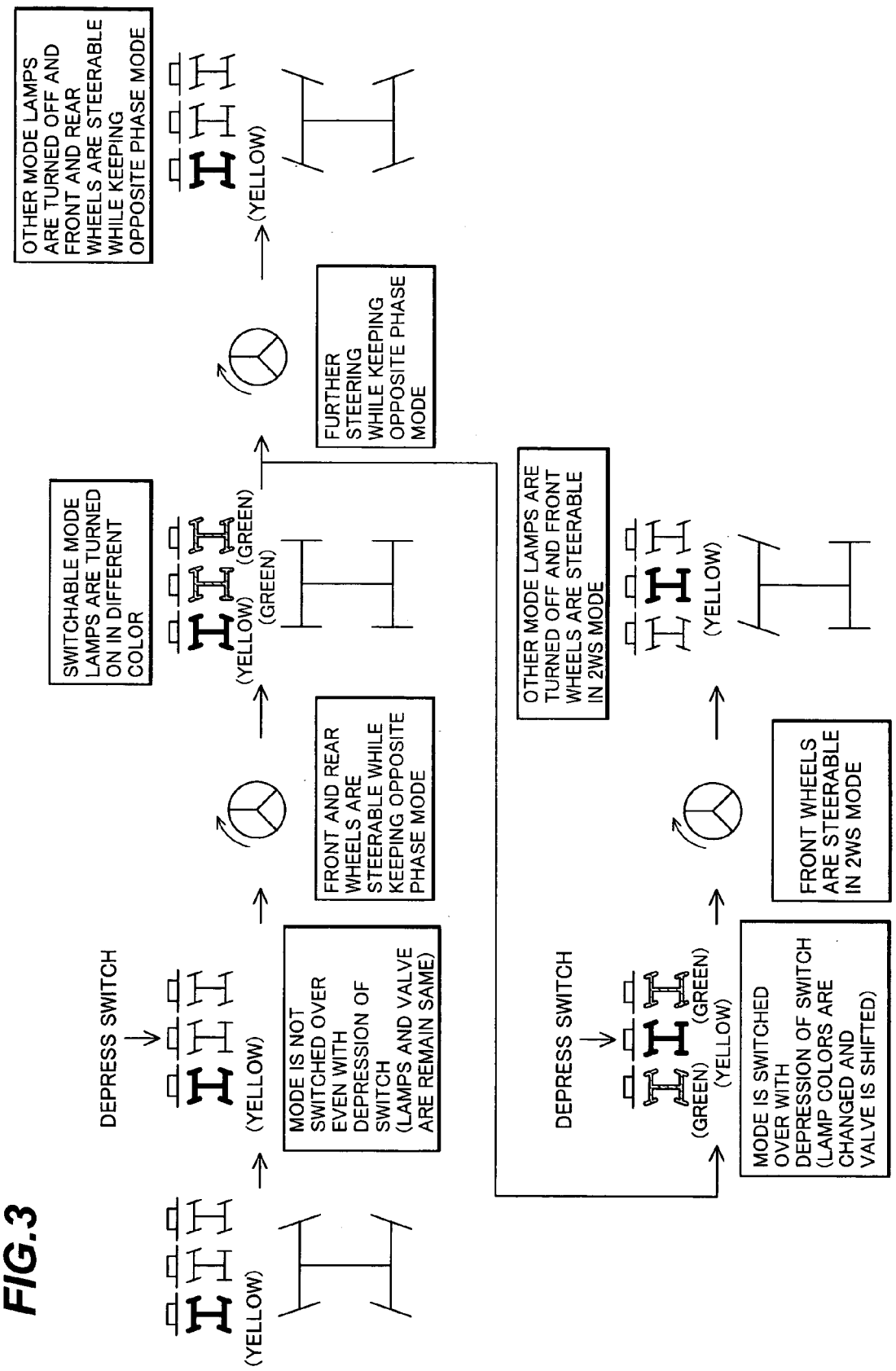
FIG. 3 shows indication examples of a mode indicator along with examples of the operation.

FIG. 3 shows examples of the operation.

When the current steering mode (i.e., the current shift position of the mode changing valve 24) is the 4WS mode with the mode changing valve 24 shifted to the second position B and the front wheels 1, 1 and the rear wheels 2, 2 are not at neutral, the 4WS mode lamp 38*b* of the mode indicator 38 is turned on yellow and the other mode lamps 38*a*, 38*c* are turned off (S110 in FIG. 2). In this condition, even when the 2WS push button 35*a*, for example, is depressed, the resulting instruction signal is ignored, whereby the steering mode is not changed and the turning-on/off states of the mode lamps 38a to 38c remain the same (S102→S120→S100 in FIG. 2). By turning the steering wheel 40 while the steering mode is kept in the 4WS mode, the angles of the front wheels 1, 1 and the rear wheels 2, 2 are changed and the steering operation is performed, as described above. When the front wheels 1, 1 and the rear wheels 2, 2 come into neutral as a result of steering the front wheels 1, 1 and the rear wheels 2, 2, the mode lamps 38a, 38c of the mode indicator 38, which have been turn off so far, are turned on green (S112 in FIG. 2). By further turning the steering wheel 40 while the steering mode is kept in the 4WS mode, the front wheels 1, 1 and the rear wheels 2, 2 are steered, whereby the front wheels 1, 1 and the rear wheels 2, 2 come out of neutral. Therefore, the mode lamps 38a, 38c of the mode indicator 38, which have been turn on green for a moment, are turned off again (S110 in FIG. 2).

On the other hand, if the 2WS push button 35a, for example, is depressed in the state where the front wheels 1, 1 and the rear wheels 2, 2 come into neutral and the mode lamps 38a, 38c are turned on green, the mode changing valve 24 is shifted to the first position A and the steering mode is changed from 4WS to 2WS (S102→S120→S122 in FIG. 2). Also, the 2WS mode lamp 38a of the mode indicator 38 is turned on yellow and the 4WS mode lamp 38b which has been turned on yellow so far is turned on green (S124 in FIG. 2). By turning the steering wheel 40 while the steering mode is kept in the 2WS mode, the angles of the front wheels 1, 1 are changed and the steering operation is performed with the front wheels 1, 1, as described above. When the front wheels 1, 1 come out of neutral as a result of steering the front wheels 1, 1, the mode lamps 38b, 38c of the mode indicator 38, which have been turn on green, are turned off (S110 in FIG. 2).

Figure 4:
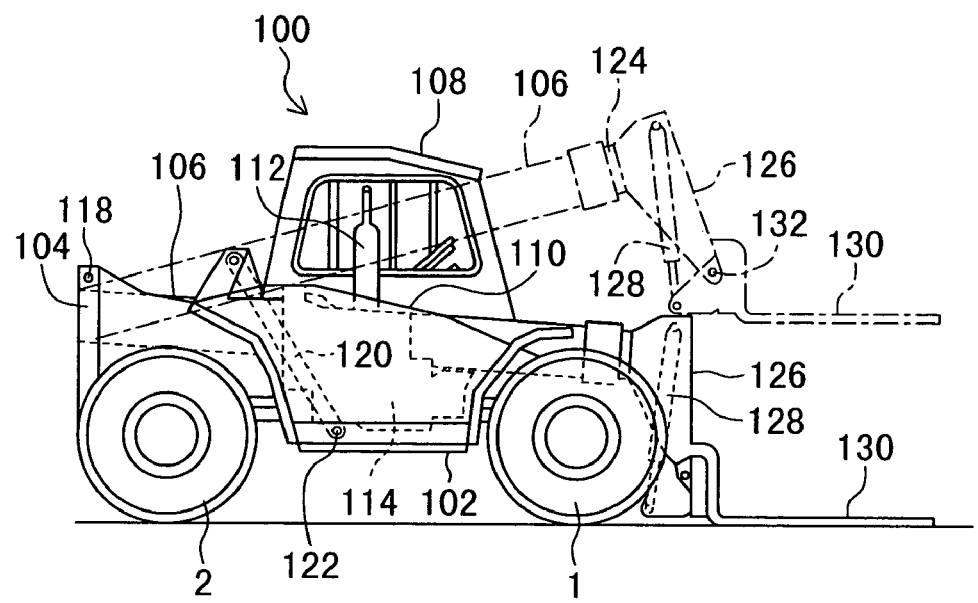
FIG. 4 is a side view of a lift truck as one example of the working vehicle in which the steering system of the present invention is equipped.
Figure 5:
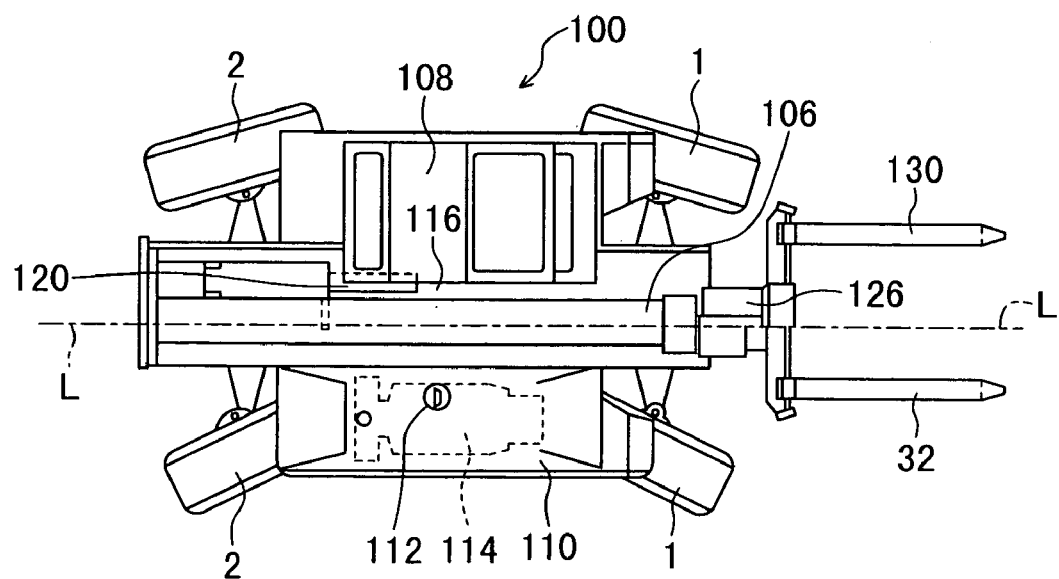
FIG. 5 is a plan view of a lift truck as one example of the working vehicle in which the steering system of the present invention is equipped.

FIGS. 4 and 5 show an appearance of a lift track as one example of working vehicles to which the present invention is applied.

Referring to FIGS. 4 and 5, numeral 100 denotes a lift truck. The lift truck 100 comprises a support deck structure 102 constituting a wheel mounting structure to which the front wheels 1, 1 and the rear wheels 2, 2 are mounted, and an extendable lift arm 106 rotatably supported to an upright plate 104 which is supported by a rear end of the support deck structure 102. A cab 108 is disposed on an upper surface of the support deck structure 102 at a position offset to one lateral side, i.e., on one side with respect to an axis L—L in the vehicular longitudinal direction of the lift truck 100.

On the other side opposed to the cab 108 with respect to the axis L—L, a housing 110 is supported by the support deck structure 102. An internal combustion engine 114 provided with an exhaust pipe 112 extending in the vertical direction is disposed in the housing 110 such that a shaft of the internal combustion engine 114 is extended in the vehicular longitudinal direction, i.e., parallel to the axis L—L. The housing 110 is disposed at a certain distance away from the cab 108 while leaving a space 116 with respect to the cab 108. The space 116 is set to have at least the same width as that of the lift arm 106. The lift arm 106 is rotatably supported by a horizontal pin 118 serving as a fulcrum, which provides a horizontal axis arranged perpendicularly to the axis L—L in the vehicle longitudinal direction. The horizontal pin 118 is disposed at such a height as allowing the lift arm 106 to be partly received in the space 116 when it is in a fully downward rotated state.

In FIG. 4, the extendable lift arm 106 is shown as being in a fully withdrawn state. A dotted contour line partly indicates the lift arm 106 in a raised state, and a solid line indicates it in the fully downward rotated state. When the lift arm 106 is in the fully downward rotated state, it is positioned in the space 116 while extending in the vehicular longitudinal direction adjacently to the cab 108, so that the lift arm does not interfere with the viewing field of the operator sitting in the cab 108 and operating the lift truck.

The lift arm 106 is rotatable about the horizontal pin 118 by a hydraulic jack 120, and a lower portion 122 of the hydraulic jack 120 is rotatably supported to a central portion of the support deck structure 102. When the lift arm 106 is in the downward rotated state, the hydraulic jack 120 is inclined in a head-down posture.

An end element 124 capable of sliding inside the extendable lift arm 106 supports a head portion 126, and a tool 130 rotatable by a jack 128 is supported by the head portion 126 through a pin 132.

In an illustrated example, the tool 130 is constituted as a fork-shaped lift, but another type of tool, such as a bucket, may also be used instead of the fork-shaped lift.

This embodiment constructed as described above can provide the following advantages.

(1) When the front wheels 1, 1 and the rear wheels 2, 2 are not at neutral (when, of the mode lamps 38a, 38b and 38c of the mode indicator 38, the mode lamps other than one corresponding to the current steering mode, which is turned on yellow, are turned off), the mode changing valve 24 is not operated even with the instruction outputted from the mode change switch 35. Therefore, even if the operator manipulates the mode change switch 35 unintentionally when the front wheels 1, 1 and the rear wheels 2, 2 are not at neutral, the steering mode is not changed and the front wheels 1, 1 and the rear wheels 2, 2 are always held in proper postures corresponding to the current steering mode. Superior operability can be thus obtained.

(2) The mode indicator 38 is constructed so as to always indicate, as the current steering mode, a steering mode corresponding to the shift position of the mode changing valve 24 (i.e., to always turn on yellow one of the mode lamps 38a, 38b and 38c of the mode indicator 38, which corresponds to the steering mode established by the mode changing valve 24 and functions as the mode lamp corresponding to the current steering mode). Therefore, even if the operator manipulates the mode change switch 35 unintentionally when the front wheels 1, 1 and the rear wheels 2, 2 are not at neutral, the mode changing valve 24 is not shifted as mentioned above and therefore the indication of the mode indicator 38 is also not changed. Hence, the operator can always change the steering mode while recognizing the proper steering mode and can perform the mode changing operation with safety, thus resulting in high reliability.

(3) A part of the lamps of the mode indicator 38 (i.e., of the mode lamps 38a, 38b and 38c of the mode indicator 38, the mode lamps other than one corresponding to the current steering mode and turned on yellow) is employed as a neutral lamp (second indicating means) for indicating whether the front wheels 1, 1 and the rear wheels 2, 2 are at neutral. Thus, since the mode lamps 38a, 38b and 38c serve also as neutral lamps, the construction is simplified. Also, since the operator is able to simultaneously know both the current steering mode and whether the front wheels 1, 1 and the rear wheels 2, 2 are at neutral, by looking at the mode lamps 38a, 38b and 38c of the mode indicator 38, very high convenience is realized in use.

(4) The push buttons 35a, 35b and 35c of the mode change switch 35 are disposed in positions respectively corresponding to the mode lamps 38a, 38b and 38c of the mode indicator 38. Therefore, the operator can instruct change of the steering mode while looking at the mode lamps 38a, 38b and 38c (first and second indicating means), and very high convenience is realized in use.

(5) The push buttons 35a, 35b and 35c of the mode change switch 35 are constituted as momentarily operated switches which output signals only when depressed by the operator. Therefore, even if the operator manipulates any push button of the mode change switch 35 unintentionally when the front wheels 1, 1 and the rear wheels 2, 2 are not at neutral, the outputted signal disappears when the operator releases the hand from the push button. Accordingly, unless the mode change switch is manipulated again when the front wheels 1, 1 and the rear wheels 2, 2 are at neutral, the steering mode is not changed. As a result, the steering mode can be reliably changed in accordance with the intention of the operator, whereby operability and reliability can be further improved.

While, in the above-described embodiment, the present invention is applied to a lift truck as one example of working vehicles, the present invention is also applicable to any other type of working vehicle having front and rear wheels, such as a roughterrain crane. Further, while the present invention is applied to a system for changing the steering mode among three modes, i.e., 2WS (front two-wheel steering), 4WS (opposite-phase four-wheel steering), and "Crab" (in-phase four-wheel steering), the present invention is also applicable to a system for changing the steering mode between two modes, i.e., 2WS (front two-wheel steering) and 4WS (opposite-phase four-wheel steering).

Further, in the above-described embodiment, the mode change switch 35 and the mode indicator 38 are constructed integrally with each other, and the push buttons 35a, 35b and 35c of the mode change switch 35 are disposed close to the mode lamps 38a, 38b and 38c of the mode indicator 38 in one-to-one corresponding relation, respectively. However, the mode change switch 35 and the mode indicator 36 may be constructed separately from each other, and the above advantages (1), (2), (3) and (5) can also be obtained with such an arrangement. Moreover, while the push buttons 35a, 35b and 35c of the mode change switch 35 are constituted as momentarily operated switches which output signals only when depressed by the operator, the push buttons 35a, 35b and 35c of the mode change switch 35 may be of the holding type that, after one button is depressed, a resulting ON state is held until another button is depressed. This case can also provide the above advantages (1), (2), (3) and (4).

Additionally, in the above-described embodiment, the two neutral sensors 36, 37 for the front wheels 1, 1 and the rear wheels 2, 2 are used as neutral sensors for detecting whether the front wheels 1, 1 and the rear wheels 2, 2 are at neutral. However, because the front wheels 1, 1 and the rear wheels 2, 2 are steered in synchronous relation in the present invention, it is also possible to employ only the neutral sensor 36 for detecting whether the front wheels 1, 1, of which angles are changed in any steering mode, are at neutral.

INDUSTRIAL APPLICABILITY

According to the present invention, in a working vehicle in which a mode of steering front and rear wheels can be changed over between two-wheel steering and four-wheel steering, a steering system having superior operability and high reliability can be provided.

The invention claimed is:

1. A steering system for a working vehicle comprising front wheels, rear wheels, and a steering apparatus for steering the front wheels and the rear wheels, said steering system comprising:
   mode changing means provided in said steering apparatus for changing over a mode of steering the front wheels and the rear wheels between two-wheel steering and four-wheel steering;
   mode change instructing means for instructing change of the mode of steering the front wheels and the rear wheels;
   first indicating means for indicating a current steering mode of the front wheels and the rear wheels;
   second indicating means for indicating whether the front wheels and the rear wheels are at neutral; and
   control means for controlling said mode changing means and said first indicating means so that an instruction outputted from said mode change instructing means is made ineffective and said mode changing means is not operated even with said instruction outputted from said mode change instructing means when said second indicating means indicates that the front wheels and the rear wheels are not at neutral, and said mode changing means is operated, in response to an instruction outputted from said mode change instructing means, to establish a steering mode corresponding to the instruction only when said second indicating means indicates that the front wheels and the rear wheels are at neutral, and that said first indicating means always indicates, as the current steering mode, a steering mode corresponding to an operated state of said mode changing means regardless of the instruction outputted from said mode change instructing means.

2. A steering system for a working vehicle according to claim 1, wherein:
   said first indicating means has a plurality of mode lamps provided corresponding to kinds of steering modes, one of the mode lamps corresponding to the current steering mode being turned on in a predetermined color, and
   one or more of the plurality of mode lamps other than the mode lamp corresponding to the current steering mode function as said second indicating means.

3. A steering system for a working vehicle according to claim 2, wherein:
   the mode lamps functioning as said second indicating means are turned on in a color different from that of the mode lamp corresponding to the current steering mode when the front wheels and the rear wheels are in neutral positions.

4. A steering system for a working vehicle according to claim 2, wherein:
   said mode change instructing means has a plurality of switches disposed in positions corresponding to the plurality of mode lamps, respectively.

5. A steering system for a working vehicle according to claim 4, wherein:
   the plurality of switches are momentarily operated switches outputting signals only when operated.

6. A steering system for a working vehicle according to claim 1, wherein:
   said mode changing means is able to change over the mode of steering the front wheels and the rear wheels among two-wheel steering, opposite-phase four-wheel steering, and in-phase four-wheel steering.

* * * * *